United States Patent [19]

Brugel

[11] Patent Number: 5,214,107
[45] Date of Patent: May 25, 1993

[54] CHLORINATION OF OLEFIN POLYMERS IN CHLOROFLUOROBENZENE

[75] Inventor: Edward G. Brugel, Wilmington, Del.

[73] Assignee: E. I. Du Pont de Nemours and Company, Wilmington, Del.

[21] Appl. No.: 923,591

[22] Filed: Aug. 3, 1992

[51] Int. Cl.$^5$ .............................................. C08F 8/22
[52] U.S. Cl. ................................. 525/344; 525/334.1; 525/356
[58] Field of Search .............................. 525/344, 356

[56] References Cited

U.S. PATENT DOCUMENTS 2,920,064  1/1960  Baptist et al. .
3,180,856  4/1965  Szalla et al. .

FOREIGN PATENT DOCUMENTS 60-001206  1/1985  Japan .
4-020506   1/1992  Japan .

Primary Examiner—Bernard Lipman
Attorney, Agent, or Firm—Marilyn H. Bromels

[57] ABSTRACT

Monochloromonofluorobenzene provides a reaction medium for chlorination of $C_2$-$C_8$ olefin polymers which is inert to chlorination and does not function as a stratospheric ozone depleter.

8 Claims, No Drawings

CHLORINATION OF OLEFIN POLYMERS IN CHLOROFLUOROBENZENE

BACKGROUND OF THE INVENTION

This invention relates to a process for preparation of chlorinated polyolefin resins in a reaction medium which is resistant to chlorination.

Chlorinated olefin polymers are well-known and widely available compositions which find use as general purpose elastomers, adhesives, and coating compositions. The polymers provide excellent resistance to acids, bases, and solvents, and, in addition, they display a high degree of flexibility, ozone resistance, and general overall weatherability. Substantial quantities of these produces are fabricated into pond and pit liners, roofing membranes, binder resins for coatings, gaskets, wire coverings, and adhesives.

The polymers are prepared on a commercial scale by solution or suspension chlorination olefin homopolymers or copolymers in a chlorinated reaction medium, such as carbon tetrachloride, chloroform, methylene chloride, or trichlorofluoromethane. When a solvent process is used the preferred medium is carbon tetrachloride because it is totally inert to chlorination, it is readily available, and it is easily separated from the polymer product. The use of carbon tetrachloride has been increasingly restricted however due to its activity as a stratospheric ozone depleter and the fact that it is a suspected human carcinogen. Consequently there is a need in the art for a solvent which can be used in chlorination reactions on a commercial scale which combines the desirable features of carbon tetrachloride without its disadvantages.

SUMMARY OF THE INVENTION

The present invention provides a process for chlorination of olefin polymers in a reaction medium which is substantially inert to chlorination and which does not deplete ozone. More specifically, the present invention provides a process for chlorination of olefin polymers which comprises (a) dissolving or suspending a $C_2$-$C_8$ olefin polymer in monochloromonofluorobenzene, (b) introducing a chlorinating agent selected from the group consisting of elemental chlorine, sulfuryl chloride, and a mixture of elemental chlorine and sulfur dioxide into the reaction mixture in the presence of a free radical initiator, (c) chlorinating the olefin polymer at a temperature of 50°-150° C., and (d) isolating the chlorinated olefin polymer from the reaction mixture.

DETAILED DESCRIPTION OF THE INVENTION

A wide variety of olefin polymers may be used in the process of the present invention. By olefin polymers is meant homopolymers and copolymers of $C_2$-$C_8$ alpha-monoolefins, including graft copolymers. Particularly useful examples include homopolymers of $C_2$-$C_3$ alpha monoolefins, copolymers of ethylene and carbon monoxide, and copolymers of ethylene and at least one ethylenically unsaturated monomer selected from the group consisting of $C_3$-$C_{10}$ alpha monoolefins, $C_1$-$C_{12}$ alkyl esters of unsaturated $C_3$-$C_{20}$ monocarboxylic acids, unsaturated $C_3$-$C_{20}$ mono- or dicarboxylic acids, anhydrides of unsaturated $C_4$-$C_8$ dicarboxylic acids, and vinyl esters of saturated $C_2$-$C_{18}$ carboxylic acids. Specific examples of these polymers include polyethylene, polypropylene, ethylene vinyl acetate copolymers, ethylene acrylic acid copolymers, ethylene methacrylic acid copolymers, ethylene methyl acrylate copolymers, ethylene methyl methacrylate copolymers, ethylene n-butyl methacrylate copolymers, ethylene glycidyl methacrylate copolymers, graft copolymers of ethylene and maleic anhydride, graft copolymers of propylene and maleic anhydride, and copolymers of ethylene with propylene, butene, 3-methyl-1-pentene, or octene. Preferred olefin polymers are polyethylene and copolymers of ethylene and vinyl acetate. The olefin polymers have number average molecular weights within the range of 1,000 to 300,000.

The process of the invention is carried out by first dissolving or suspending the olefin polymer in monochloromonofluorobenzene. Chlorination of the olefin polymer is accomplished by passing elemental chlorine into the reaction solvent at temperatures of about 50°-150° C., preferably 80°-110° C. In addition, the reaction is preferably run at pressures of 0.10-0.35 MPa. In a further embodiment, chlorosulfonyl cure sites may be introduced concurrently with polymer backbone chlorination by employing either sulfuryl chloride or a mixture of chlorine and sulfur dioxide as the chlorinating agent. Sufficient chlorinating agent is introduced to provide a polymer chlorine level as high as desired, up to the theoretical limit. In the case of polyethylene, this is approximately 70 weight percent chlorine. Generally, chlorine levels of at least 20 weight percent are desirable to provide products having good chemical resistance.

The chlorination reaction is promoted by means of a free radical initiator such as an organic peroxide, an organic hydroperoxide or an aliphatic azo compound. Typical initiators include 2,2'-azobis(2-methylpropane nitrile), benzoyl peroxide, diisopropylbenzene hydroperoxide, and $\alpha\alpha'$-azobis($\alpha,\gamma$-dimethylvaleronitrile). Generally the initiator is present in amounts of 0.1-3% by weight of polymer present.

The chlorination or chlorosulfonation reaction may be carried out as a batch or continuous operation.

The chlorinated or chlorosulfonated products may be isolated from the reaction mixture by any of the well-known means for isolating chlorinated polyolefins from solution or suspension, for example, by precipitation into methanol, by removing the solvent by steam distillation, by extruder devolatilization, or by use of a drum dryer, whereby the product forms a porous layer containing little or no solvent.

A critical feature of the process of the present invention is the choice of solvent. A variety of chlorinated and fluorinated solvents have been used in the past as reaction media in polyolefin chlorination reactions, for example, carbon tetrachloride, chloroform, monochlorobenzene, dichlorobenzene, fluorobenzene, dichloroethane, dichlorodifluoromethane, and trichlorotrifluoroethane. The use of each of these solvents is associated with certain disadvantages. Carbon tetrachloride and many of the chlorinated fluorocarbon solvents deplete stratospheric ozone. Dichlorobenzene and other highly chlorinated compounds have high boiling points, which renders their use economically unattractive due to high costs associated with separation of product from the solvent. Chloroform, monochlorobenzene, dichloroethane, fluorobenzene, and many other chlorofluorocarbons and hydrochlorofluorocarbons are not totally inert to chlorination. In the case of chloroform this leads to production of carbon tetrachloride during the reaction which is ecologically undesirable, while in the case of the other compounds chlorinated solvent mixtures are produced. Consequently, as the reaction medium is recycled the percentage of chlorinated solvent gradually increases and the boiling point of the reaction medium rises. Separation of chlorinated polyolefin product from the reaction medium thus becomes more difficult and expensive with time.

It has now however been found that the monochlorinated monofluorobenzenes provide a reaction medium for chlorination of $C_2$-$C_8$ olefin polymers which is substantially inert to chlorination despite the fact that other chlorinated and fluorinated benzene compounds are chlorinated under conditions in which chlorination of polyolefins takes place. That is, when $C_2$-$C_8$ olefin polymers are chlorinated under free radical conditions, at temperatures of 50°-150° C. in monochloromonofluorbenzene, substantially no dichlorinated benzene species are formed. A further advantage of the monochloromonofluorobenzenes is that they do not deplete stratospheric ozone.

Any of the isomers of monochloromonofluorobenzene may be utilized as chlorination reaction media in the process of the invention, but 1-chloro-4-fluorobenzene is preferred because it is readily available. The amount of chlorofluorobenzene employed is not critical, and both solution and suspension processes may be used. In general it is preferred to use sufficient chlorofluorobenzene to dissolve the olefin polymer to be chlorinated because the solution process results in a more homogeneous product. In addition, more efficient temperature control is attained when solutions of relatively low viscosity are utilized as reaction media because hot spots are eliminated.

The chlorinated polymer products which are produced by the process of the present invention are equivalent to those prepared using carbon tetrachloride as a solvent and may be used to form coating compositions, articles such as tubing, gaskets, hoses, pond and pit liners, and adhesives.

EXAMPLES

The percentage of chlorinated and fluorinated benzene species in each of the following examples was determined by GC/mass spectroscopy using a Hewlett Packard 5890 GC/5971A MS instrument.

EXAMPLE 1

A one liter Buchii Type II autoclave was charged with 50 g polyethylene (density 0.92, Brookfield Viscosity 180 cP at 140° C.). A 300 ml aliquot of 1-chloro-4-fluorobenzene and 0.25 g of a 1% solution of 2,2'-azobis-[2-methylpropanenitrile] in 1-chloro-4-fluorobenzene were then added. The autoclave was pressurized with nitrogen and heated to 100° C. over a period of 30 minutes. The nitrogen flow was stopped and chlorine gas was introduced at a rate of 0.817 g/minute. The reaction temperature was maintained at 100°-105° C. and chlorine gas was continuously fed to the autoclave for 200 minutes. At this point the chlorine feed was stopped and nitrogen was introduced. The reaction mixture was cooled to room temperature and adjusted to atmospheric pressure. The chlorinated polyethylene product was isolated by precipitation into methanol using a high speed blender. The polymer was washed twice with methanol and dried overnight in a vacuum oven at 40° C. The chlorine content of the dried polymer was 70.08%. An aliquot of the reaction medium was removed after completion of the reaction and analyzed by GC/mass spectroscopy. No dichlorinated benzene species were detected by GC/mass spectroscopy.

COMPARATIVE EXAMPLE 1

Example 1 was repeated using fluorobenzene in place of 1-chloro-4-fluorobenzene. The chlorinated polyethylene product had a chlorine content of 65.1%. Analysis of the reaction medium after completion of the reaction by GC/mass spectroscopy indicated that approximately 2.4% of the fluorobenzene had been converted to chlorofluorobenzene.

COMPARATIVE EXAMPLE 2

Example 1 was repeated using chlorobenzene in place of 1-chloro-4-fluorobenzene. The chlorinated polyethylene product had a chlorine content of 60.7%. After completion of the reaction of the chlorobenzene reaction medium contained greater than 2% dichlorobenzene as determined by GC/mass spectroscopy.

COMPARATIVE EXAMPLE 3

Example 1 was repeated using 1,4-difluorobenzene in place of 1-chloro-4-fluorobenzene. The chlorinated polyethylene product had a chlorine content of 65.8%. After completion of the reaction the difluorobenzene reaction medium contained greater than 10% chlorofluorobenzene as determined by GC/mass spectroscopy.

COMPARATIVE EXAMPLE 4

Example 1 was repeated using 1-bromo-4-fluorobenzene in place of 1-chloro-4-fluorobenzene. The chlorinated polyethylene product had a chlorine content of less than 40%. The reaction was discontinued after 60 minutes due to the high rate of reaction of chlorine with the 1-bromo-4-fluorobenzene. The reaction medium contained more than 45% chlorofluorobenzene as determined by GC/mass spectroscopy.

COMPARATIVE EXAMPLE 5

Example 1 was repeated using 1,3-dichlorobenzene in place of 1-chloro-4-fluorobenzene. The chlorinated polyethylene product had a chlorine content of 67.2%. After completion of the reaction the difluorobenzene reaction medium contained approximately 1% trichlorobenzene as determined by GC/mass spectroscopy.

COMPARATIVE EXAMPLE 6

Example 1 was repeated using carbon tetrachloride in place of 1-chloro-4-fluorobenzene. The chlorinated polyethylene product had a chlorine content of 70.9%.

The above examples illustrate that chlorination of olefin polymers proceeds as efficiently in chlorofluorobenzene as in carbon tetrachloride and that chlorofluorobenzene provides a medium which is inert to chlorination in contrast to fluorobenzene, chlorobenzene, difluorobenzene, dichlorobenzene, or bromofluorobenzene.

EXAMPLE 2

A one liter Buchii Type II autoclave was charged with 50 g acrylic acid/polypropylene graft copolymer (BP Chemicals Grade 95-100-04-100 Melt Index). A 300 ml aliquot of 1-chloro-4-fluorobenzene and 0.25 g of a 1% solution of 2,2'-azobis-[2-methylpropanenitrile] in 1-chloro-4-fluorobenzene were then added. The autoclave was pressurized with nitrogen and heated to 100° C. over a period of 30 minutes. At 100° C. the polymer became dispersed in the 1-chloro-4-fluorobenzene solvent, but never dissolved. The nitrogen flow was stopped and chlorine gas was introduced at a rate of 0.817 g/minute. The reaction temperature was maintained at 100°-105° C. and chlorine gas was continuously fed to the autoclave for 200 minutes. At this point the chlorine feed was stopped and nitrogen was introduced. The chlorinated polymer remained dispersed throughout the 1-chloro-4-fluorobenzene medium. The reaction mixture was cooled to room temperature and adjusted to atmospheric pressure. The chlorinated polyethylene product was isolated by precipitation into methanol using a high speed blender. The polymer was washed twice with methanol and dried overnight in a vacuum oven at 40° C. The chlorine content of the dried polymer was 24.42%. An aliquot of the reaction medium was removed after completion of the reaction and analyzed by GC/mass spectroscopy. No dichlorinated benzene species were detected by GC/mass spectroscopy.

I claim:

1. A process for preparation of a chlorinated olefin polymer which comprises (a) dissolving or suspending a $C_2$-$C_8$ olefin polymer in monochloromonofluorobenzene, (b) introducing a chlorinating agent selected from the group consisting of elemental chlorine, sulfuryl chloride, and a mixture of elemental chlorine and sulfur dioxide into the reaction mixture in the presence of a free radical initiator, (c) chlorinating the olefin polymer at a temperature of 50°-150° C. and (d) isolating the chlorinated olefin polymer from the reaction mixture.

2. The process of claim 1 wherein the chlorinated olefin polymer produced is a chlorosulfonated olefin polymer.

3. The process of claim 1 wherein the chlorination takes place at a temperature of 80°-110° C.

4. The process of claim 1 wherein the chlorination takes place at a pressure of 0.10-0.25 MPa.

5. The process of claim 1 wherein the olefin polymer is selected from the group consisting of homopolymers of $C_2$-$C_8$ alpha monoolefins, copolymers of ethylene and carbon monoxide, and copolymers of ethylene and at least one ethylenically unsaturated monomer selected from the group consisting of $C_3$-$C_{10}$ alpha monoolefins, $C_1$-$C_{12}$ alkyl esters of unsaturated $C_3$-$C_{20}$ monocarboxylic acids, unsaturated $C_3$-$C_{20}$ mono- or dicarboxylic acids, anhydrides of unsaturated $C_4$-$C_8$ dicarboxylic acids, and vinyl esters of saturated $C_2$-$C_{18}$ carboxylic acids.

6. The process of claim 1 wherein the olefin polymer is polyethylene.

7. The process of claim 1 wherein the olefin polymer is ethylene vinyl acetate.

8. The process of claim 1 wherein the monochloromonofluorobenzene is 1-chloro-4-fluorobenzene.

* * * * *